US 6,634,228 B2

(12) United States Patent
Deserno et al.

(10) Patent No.: US 6,634,228 B2
(45) Date of Patent: Oct. 21, 2003

(54) METHOD OF MEASURING LEVEL IN A VESSEL

(75) Inventors: Rolf Deserno, Loerrach (DE); Dietmar Spanke, Loerrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/055,899

(22) Filed: Jan. 28, 2002

(65) Prior Publication Data

US 2002/0100317 A1 Aug. 1, 2002

Related U.S. Application Data

(60) Provisional application No. 60/264,028, filed on Jan. 26, 2001.

(51) Int. Cl.⁷ ............................................. G01F 23/28
(52) U.S. Cl. .................................. 73/290 V; 73/290 R
(58) Field of Search ........................... 73/290 R, 290 V

(56) References Cited

U.S. PATENT DOCUMENTS 5,948,979 A * 9/1999 Fitsch et al. .............. 73/290 V
6,412,344 B1 * 7/2002 Danicich et al. .......... 73/290 V

* cited by examiner

Primary Examiner—Hezron Williams
Assistant Examiner—Rodney Frank
(74) Attorney, Agent, or Firm—Jones, Tullar & Cooper, P.C.

(57) ABSTRACT

A method of measuring level in a vessel by means of a level measuring device operating with pulses is disclosed. Based on waves being transmitted into the vessel and reflected from the contents of the vessel a digital sampling sequence, representative of the amplitudes of the waves, is generated and a transit time difference, representative of the measuring level, is determined. For determining the difference, a first data tuple, representative of a reference point in the envelope signal and a second data tuple, representative of an echo pulse in the envelope signal, are derived from the sampling sequence, each of the data tuple having an amplitude value and a time value. To obtain the transit time value of the second data tuple an extreme value representative of a highest amplitude value of the echo pulse is derived from the digital sampling sequence, wherein the extreme value being estimated by means of a first, a second and a third data record selected from sampling sequence in range of the echo pulse and wherein the second data tuple being determined by means of the extreme value, respectively.

10 Claims, 3 Drawing Sheets

METHOD OF MEASURING LEVEL IN A VESSEL

This application was filed as a provisional application on Jan. 26, 2001 as application Ser. No. 60/264,028.

FIELD OF THE INVENTION

This invention relates to a method of measuring a substance level in a vessel by means of a level measuring device operating with bursts.

BACKGROUND OF THE INVENTION

To determine level in a vessel, for example in a liquid tank or a bulk container, measuring devices operating with bursts are frequently employed which are commonly mounted above the substance whose level is to be measured.

One method of determining level, particularly quasi-continuously, is the pulse radar method. In this method, the level measuring device generates short, high-carrier-frequency microwave pulses or sound wave pulses, so-called bursts, at a repetition frequency in the range of a few hertz to a few megahertz, which are transmitted into a measured volume occupied by the substance, such as a filled volume of a liquid tank or a bulk container. If electromagnetic waves are used, a center-frequency range of the bursts preferably lies between about 0.5 and 24 GHz, while a center-frequency range of acoustic bursts lies between about 10 and 70 KHz.

Because of electrical or acoustic impedance discontinuities within the measured volume, the wave trains incident on and coupled into the contents of the vessel are partially reflected, particularly from the surface of the contents, back to the level measuring device and converted by the latter into a receive signal suitable for evaluation.

To couple the bursts into and out of the measured volume, antennas generating electromagnetic space waves and ultrasonic transducers generating electroacoustic space waves, respectively, are frequently used. Also known are level measuring devices which use a surface waveguide to conduct bursts as guided wave trains against the contents of the vessel. An essential measurand in the determination of level by the pulse radar method is a transit-time difference of the bursts, measured between a transit time of the transmit signal, which serves as a reference, and a transit time of the receive signal. Based on propagation velocities of transmitted waves and echo waves, which are known a priori or were determined, and on the geometry of the measured volume, which can be assumed to be known or be determined in operation, this transit-time difference can then be converted into a measured level value.

U.S. Pat. No. 6,087,978, for example, discloses a level measuring device operating with pulses and particularly with microwave pulses, which in operation couples transmitted waves into the vessel and receives echo waves reflected from contents of the vessel by means of a transducer element, which generates an envelope signal representative of amplitudes of transmitted waves and echo waves, and which derives from the envelope signal a measured value representative of the level of the contents.

Furthermore, the above-mentioned U.S. Pat. No. 6,087,978 as well as U.S. Pat. No. 4,521,778 and DE -A 44 07 369 disclose a corresponding method of measuring the transit time of microwave pulses using an envelope signal generated, for example, in the manner described above, the method comprising the steps of:

generating a digital sampling sequence from the envelope signal;

generating a first data tuple, which is representative of a reference point in said envelope signal;

generating a second data tuple, representative of an echo pulse in said envelope, by means of the sampling sequence, each of said data tupel having an amplitude value and an transit time value; and deriving a measured level value from a difference between a transit-time value of the first data tuple and a transit-time value of the second data tuple.

The accuracy of the measured level value depends in particular on the accuracy with which the transit-time values of the transmit pulses and the useful echo can be determined. Because of the discrete sampling of the envelope signal, a maximum attainable accuracy of the measured level value is determined in prior-art level measuring devices by the resolution of the envelope signal, i.e., by the number of sample points in the sampling system referred to a unit of time or location of the envelope signal. This assumed maximum accuracy of the measured level value may be further reduced as a result of unavoidable signal noise, for example.

SUMMARY OF THE INVENTION

It is therefore an object of the invention to provide a level measuring method which provides an accurate measured value, particularly a value accurate within a millimeter, even with a coarse resolution of the envelope signal.

To attain this object, the invention provides a method of measuring level in a vessel by means of a level measuring device operating with pulses, the method comprising the steps of:

coupling waves to be transmitted into the vessel and receiving echo waves reflected from the contents of the vessel;

generating an envelope signal representative of transmitted waves and echo waves with at least one echo pulse;

generating a digital sampling sequence from the envelope signal;

generating a first data tuple, representative of a reference point in the envelope signal;

generating a second data tuple, representative of an echo pulse in the envelope signal, by means of the sampling sequence, each of the first and second data tuple having an amplitude value and a transit time value; and deriving from the envelope signal a measured value representative of the level of the contents, this step comprising a step of determining a difference between the transit time value of the first data tuple and the transit time value of the second data tuple, wherein the step of generating the second data tuple further comprises the steps of:

determining a first data record of the sampling sequence, the first data record being representative of a local extremum of the sampling sequence and having a transit time value greater than that of the first data tuple.

determining at least a second data record of the sampling sequence having a transit time value greater than that of the first data tuple and less than that of the first data record;

determining at least a third data record of the sampling sequence having a transit time value greater than that of the first data record;

deriving from the digital sampling sequence an extreme value representative of a highest amplitude value of the echo pulse by means of the first, second, and third data records; and determining the transit time value of the second data tuple by means of the extreme value.

Furthermore, the invention consists in a method of measuring level in a vessel by means of a level measuring device operating with pulses, the method comprising the steps of:

coupling waves to be transmitted into the vessel and receiving echo waves reflected from the contents of the vessel;

generating an envelope signal representative of transmitted waves and echo waves with at least one echo pulse;

generating a digital sampling sequence from the envelope signal;

generating a first tuple, representative of a reference point in the envelope signal;

generating a second data tuple, representative of an echo pulse in the data tuple having an amplitude value and a transit time value; and deriving from the envelope signal a measured value representative of the level of the contents, this step comprising a step of determining a difference between the transit time value of the first data tuple and the transit time value of the second data tuple;

wherein the step of generating the second data tuple further comprises the steps of:

deriving from the digital sampling sequence an extreme value representative of a highest amplitude value of the echo pulse;

determining the amplitude value of the second data tuple by means of a threshold value proportional to the extreme value; and determining the transit time value of the second data tuple by means of the amplitude value of the second data tuple.

In a preferred embodiment of the method of the invention the waves to be transmitted are electromagnetic waves.

In a further preferred embodiment of the method of the invention the waves to be transmitted are microwaves.

In another preferred embodiment of the method of the invention the waves to be transmitted are sound waves.

BRIEF DESCRIPTION OF THE DRAWINGS

The invention will become more apparent by reference to the following description of an embodiment of the invention taken in conjunction with the accompanying drawings. Throughout the various figures of the drawings, like parts are designated by like reference characters. Reference characters that have already been assigned are not repeated in subsequent figures if this contributes to clarity. In the drawing:

BRIEF DESCRIPTION OF THE DRAWINGS

Figure 1:
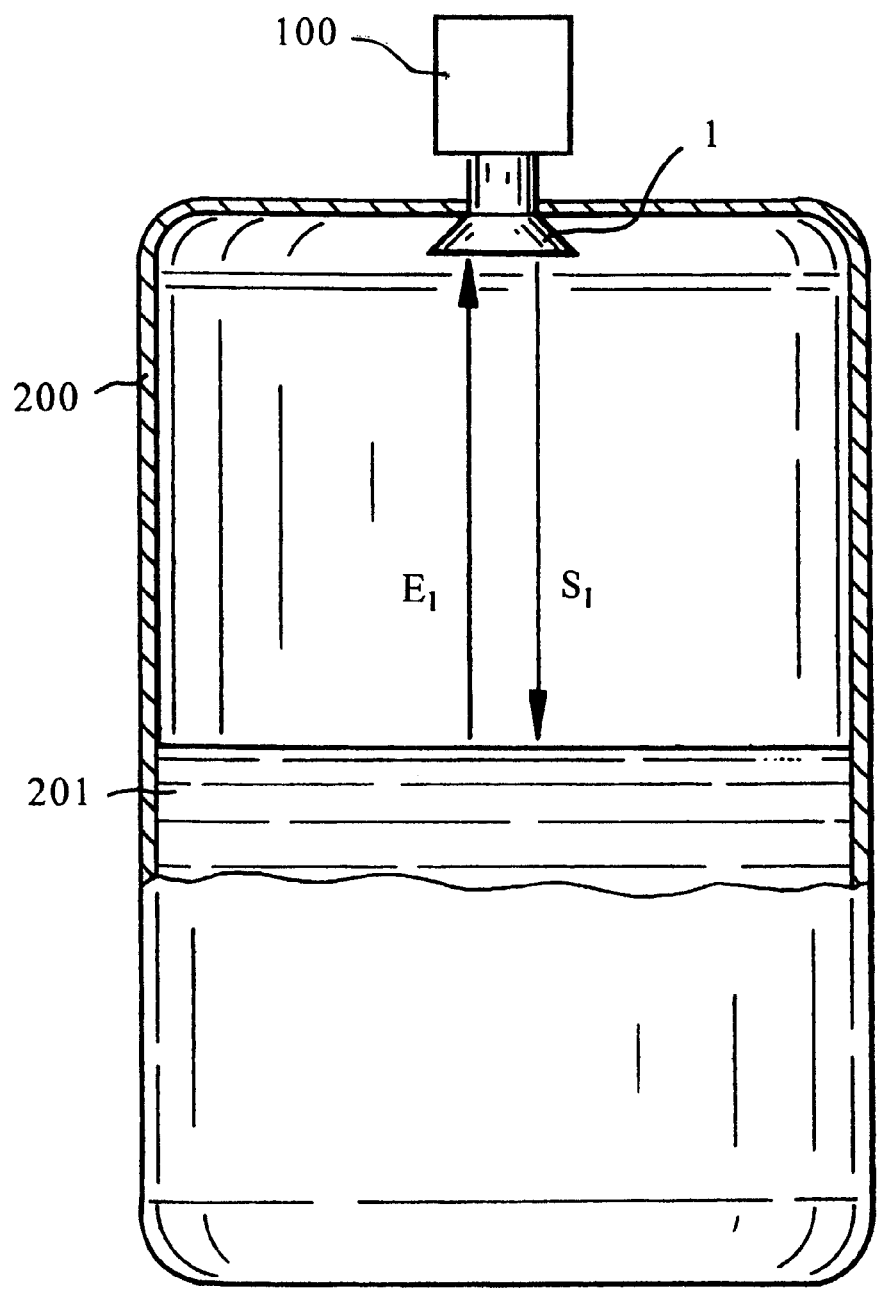
Figure 2:
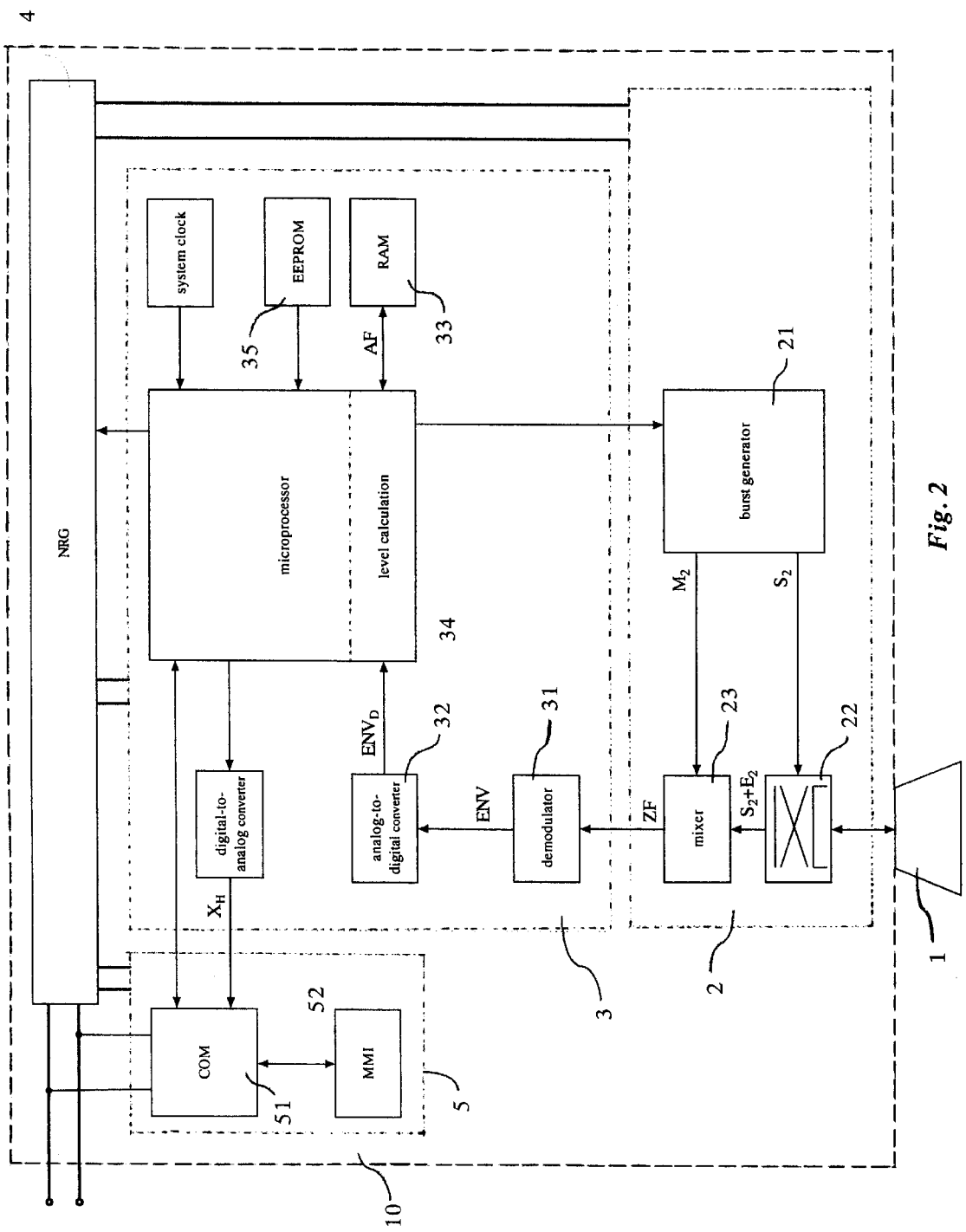
Figure 3:
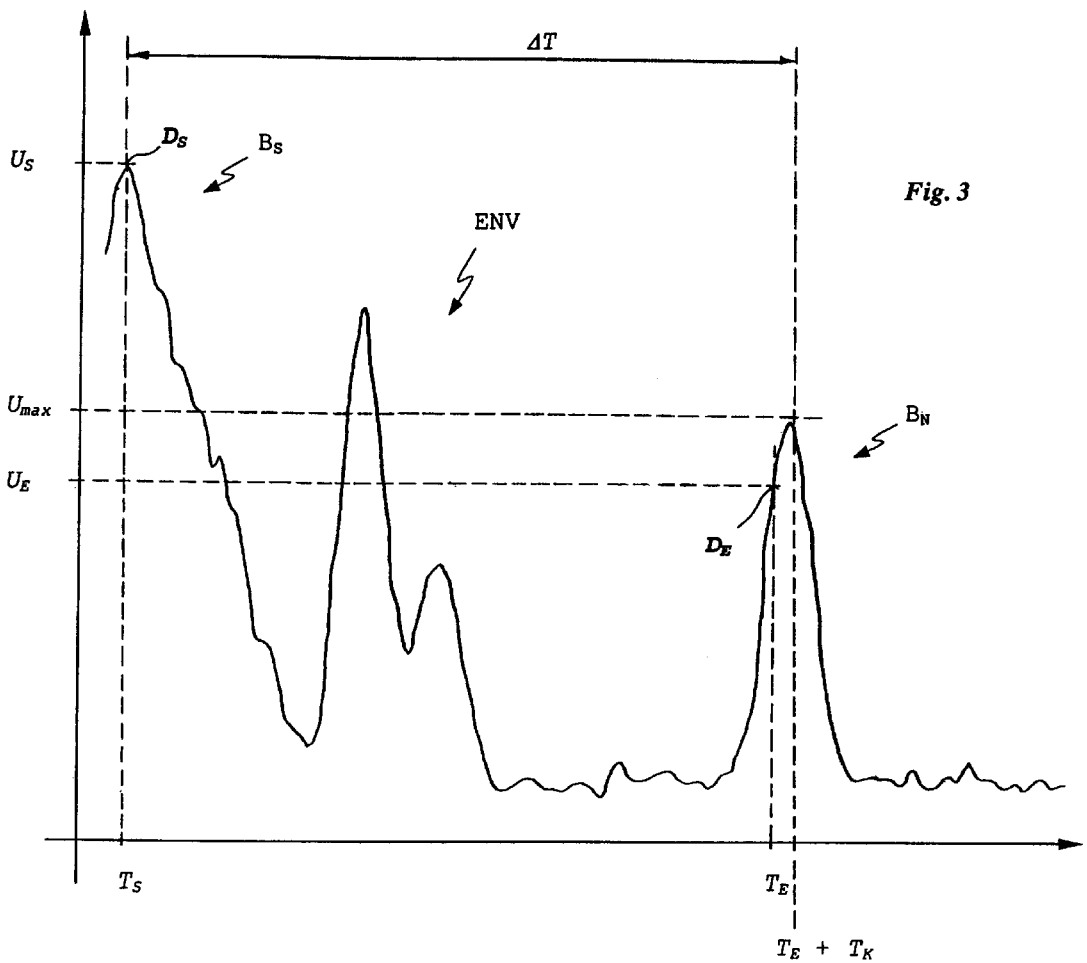
Figure 4:
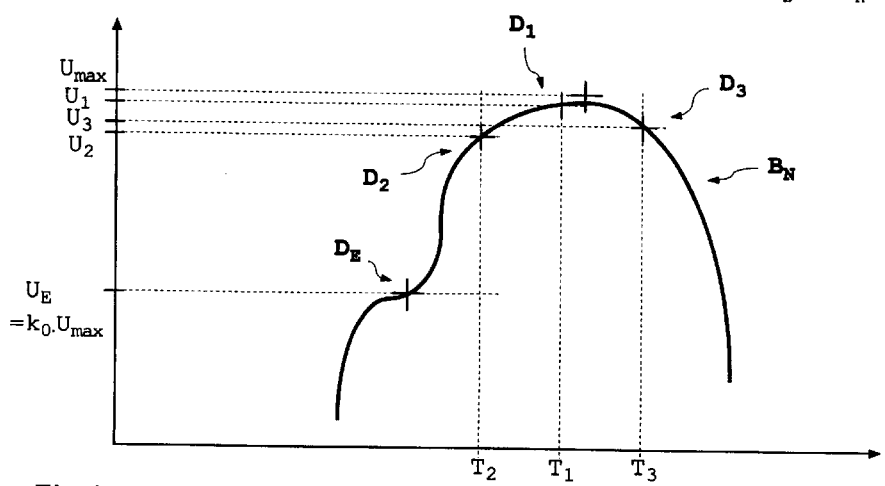

FIG. 1 shows a level measuring device mounted on a container;

FIG. 2 is a schematic block diagram showing functional elements of a measuring device operating with microwaves;

FIG. 3 is a graph of an envelope signal as can be generated by means of the level measuring device of FIG. 1; and FIG. 4 is an enlarged detail of the graph of the envelope signal of FIG. 3.

DETAILED DESCRIPTION OF EXEMPLARY EMBODIMENTS

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

Referring to FIGS. 1 and 2, there is shown an embodiment of a level measuring device operating with bursts, particularly of a device using the pulse radar technique, which is mounted on a container 200 that can be filled with a substance 201.

The level measuring device serves to determine the level of the substance 201 in the container 200 and, using a suitable control unit 3, provides a measured value $X_H$, e.g., an analog value, which is representative of the current level of the substance.

To accomplish this, the level measuring device, as shown in FIG. 1, comprises a transducer element 1 which is preferably attached to an electronic housing 100 and by means of which pulsed waves $S_1$ of predeterminable pulse shape and pulse width, e.g., 1 ns (=nanosecond), here electromagnetic waves, are transmitted as space waves toward and into a measured volume occupied by the substance 201. Transducer element 1 may, for instance, be a horn antenna as shown, or a rod antenna, a parabolic antenna, or a planar-array antenna that radiates microwaves serving as transmitted waves $S_1$. Instead of space waves, guided surface waves can be used for the level measurement.

As is customary in such level measuring devices operating with microwaves, a center frequency of the transmit signal $S_2$ lies in a range of a few gigahertz, particularly in the range of 0.5 to 30 GHz. The transducer element 1 may also be an electroacoustic transducer which generates sound waves, particularly ultrasonic waves, with a center frequency in the range of a few kilohertz, for example in a range of 10 to 100 kHz.

As a result of impedance discontinuities within the measured volume, particularly at a surface of the substance 201, the transmitted waves $S_1$ are at least partially reflected and thus converted to corresponding echo waves $E_1$, which travel back toward and are received by transducer element 1.

A transmit/receive stage 2 coupled to transducer element 1 serves to generate and process line-conducted and coherent wave packets of predeterminable pulse shape and pulse width, so-called bursts, and to produce a level-dependent sensor signal ZF by means of the bursts. The pulse shape of an individual burst commonly corresponds to that of a needle pulse of finite width.

Transmit/receive unit 2 is contained in electronics housing 100 and, as shown in FIG. 2, comprises an electronic burst generator 21 for generating a first burst sequence, which serves as a transmit signal $S_2$. In the case of a level measuring device operating with microwaves, the pulse repetition frequency of the transmit signal $S_2$ will generally be set at a range of a few megahertz, particularly at a range of 1 to 10 MHz. In the case of an ultrasonic level measuring device, this pulse repetition frequency will be a few hertz, particularly in a range of 0.5 to 10 Hz.

The transmit signal $S_2$, which appears at a first signal output of burst generator 21, is transferred by means of a directional coupler 22 of transmit/receive unit 2 to transducer element 1, which is connected to a first signal output of directional coupler 22 and which converts the signal into the above-mentioned transmitted waves $S_1$. Practically at the same time, the transmit signal $S_2$ also appears at a second signal output of directional coupler 22.

As mentioned above, the echo waves $E_1$, generated in the measured volume in the manner described above, are received by the transducer element 1 of the level measuring device and converted into a burst sequence serving as a receive signal $E_2$, which also appears at the second signal output of directional coupler 22. Accordingly, the sum of the transmit signal $S_2$ and the receive signal $E_2$, i.e., $S_2+E_2$, is provided at the second output of directional coupler 22.

Particularly if, as is usually the case with microwave level measuring devices in particular, the center frequency and/or the pulse repetition frequency of transmit signal $S_2$ is chosen to be so high that direct processing of the signal sum appearing at the second signal output of directional coupler 22 would be virtually impossible or only be possible with a large amount of circuitry, transmit/receive unit 2 may include a mixer 23 which serves to stretch the high-carrier-frequency signal sum, such that the center frequency and the pulse repetition frequency are shifted to a lower frequency range of a few kilohertz.

To stretch the signal sum $S_2+E_2$, the latter is fed from the second signal output of directional coupler 22 to a first signal input of mixer 23. At the same time, a burst sequence serving as a locally generated signal $M_2$ is applied to a second signal input of mixer 23. The pulse repetition frequency of the locally generated signal $M_2$ is chosen to be slightly lower than the pulse repetition frequency of transmit signal $S_2$, but the locally generated signal $M_2$ has practically the same center frequency as the transmit signal $S_2$. The signal $M_2$ is also generated by the burst generator 21 and, as shown in FIG. 2, is provided at a second signal output of the burst generator.

By means of mixer 23, the signal sum is amplitude-modulated with the locally generated signal $M_2$ and then low-pass filtered. The signal sum is thus mapped onto a low-frequency signal which serves as the sensor signal ZF and has been stretched by a stretching factor with respect to the signal sum. The stretching factor is equal to the quotient of the pulse repetition frequency of transmit signal $S_2$ and the difference between the pulse repetition frequency of transmit signal $S_2$ and the pulse repetition frequency of the locally generated signal $M_2$. In such level measuring devices, a center frequency of the sensor signal ZF thus generated will generally lie in the range of 50 to 200 kHz.

If, as is customary particularly with level measuring devices operating with acoustic waves, the center frequency of transmit signal $S_2$ is set at a very low value, for example at 10 kHz or 100 kHz, the signal sum may also be transferred direct to the output of transmit/receive unit 2, where it is then available as a sensor signal ZF.

Before being output from transmit/receive unit 2, the sensor signal ZF may, of course, be preamplified in a suitable manner, for example logarithmated, and thus be adapted in its shape to subsequent circuits.

To derive the measured level value $X_H$ from the sensor signal ZF, the level measuring device, as shown in FIG. 2, further comprises a control unit 3, which may also be contained in electronics housing 100.

In control unit 3, the sensor signal ZF is first supplied to a demodulator 31. The latter serves to amplitude-demodulate the sensor signal ZF and thus generate an envelope signal ENV which represents an amplitude curve of the sensor signal ZF and thus serves as a sequential image, particularly a level-influenced image, of the spatial propagation of the transmitted waves $S_1$ and echo waves $E_1$ in the measured volume. The amplitude demodulation of the sensor signal ZF may be effected using a rectifier circuit followed by a low-pass filter circuit, as proposed in DE-A 44 07 369, for example.

The envelope signal ENV is then converted by an analog-to-digital (A/D) converter 32 of control unit 3 to a corresponding digital envelope signal $ENV_D$. For the A/D converter 32, a conventional serial or parallel A/D converter, particularly an internally clocked converter, may be used.

The digital envelope signal $ENV_D$ appearing at the output of A/D converter 32 is loaded in sections into a volatile data memory 33 of control unit 3, where it is available, in the manner familiar to the person skilled in the art, as a finite sampling sequence AF in the form of digitally stored data records representing the current envelope signal ENV. The data memory 33 may be a static or dynamic random access memory, for example.

To derive the measured level value $X_H$ from the sampling sequence AF, an arithmetic circuit 34 of control unit 3 has at least temporary access, particularly read access, to data memory 33 and the data records stored therein, for example via an internal data bus. Arithmetic circuit 34 may, for instance, be implemented with a microprocessor and calculator programs executed therein, as shown schematically in FIG. 2.

The determination of the level value $X_H$ by the pulse radar technique, as mentioned above, is based on the evaluation of a transit-time difference $\Delta T$ representing a level-dependent transit time of the echo waves $E_1$, and may be expressed as follows:

$$X_H = \Delta T \cdot c \quad (1)$$

where $c$ = a propagation velocity, known a priori or determined in operation, of transmitted waves $S_1$ and echo waves $E_1$ in the measured volume.

For the transit-time difference $\Delta T$, a difference between a reference time and a transit time of the receive signal $E_2$, for example the transit time of a single echo pulse or of a sampling of stretched echo pulses, is commonly used. The transit time of the receive signal $E_2$ may, for instance, represent the instant an echo wave reflected from the substance 201, the so-called useful echo $B_N$, arrives at transducer element 1.

The reference time is determined using a transit-time value $T_s$ of a first data tuple $D_s$, which is preferably generated by means of the sampling sequence AF and represents a location and an amplitude of a significant reference point of the envelope signal ENV. The data tuple $D_s$ may, for instance, be derived directly from a single data record of the sampling sequence AF or be calculated from several data records of the sampling sequence AF. Aside from the transit-time value $T_s$, the data tuple $D_s$, as shown in FIG. 3, has a amplitude value Us, which corresponds to the signal amplitude in the above-mentioned manner. Such a reference point may, for instance, be a maximum value of the envelope signal ENV, which is representative of a transmit pulse $T_s$ or of a sampling of stretched transmit pulses, and its associated transit-time value. Furthermore, the data tuple $D_S$ may be generated using data records which represent echo waves generated by means of reference reflectors disposed in the measured volume. Both the signal amplitude and the location of such a reference point in the envelope signal ENV, and consequently the amplitude value $U_s$ and the transit-time value $T_s$, are dependent virtually only on waveguide properties of the level measuring device, so that they are virtually unaffected by the mounting location or the filling level.

Furthermore, a second data tuple $D_E$ with a amplitude value $U_E$ and the transit-time value $T_E$ is generated by means of the sampling sequence AF. This second data tuple is representative of a single echo pulse or a sampling of stretched echo pulses of the receive signal $E_2$, for example the useful echo $B_N$. The transit-time difference $\Delta T$ can thus be determined from the following known relation:

$$\Delta T = T_s - 0.5 \cdot T_E \qquad (2)$$

While the identification of the transmitted signal $S_2$ and, consequently, the determination of the data tuple $D_s$ are relatively unproblematic, particularly since the coupling of the transmitted signal $S_2$ into transducer element 1, as mentioned above, generally produces a maximum peak in the envelope signal ENV, so that the sampling sequence AF has at least one corresponding data record with a maximum sample value, identification of the useful echo $B_N$ in the sampling sequence AF is often possible only with highly complex evaluating techniques, for instance because of unwanted and multiple reflections within the measured volume. To prevent unwanted echoes located between a transmit pulse $B_S$ and the useful echo $B_N$ from being erroneously identified as a useful echo, an envelope of the empty vessel 200 may be plotted when the level measuring device is put into service, and stored, preferably persistently, in control unit 3. Such an envelope can then be used, for example, to set minimum threshold values that must be reached by the amplitudes of the envelope signal ENV or by the sample values of the sampling sequence AF to be accepted by arithmetic circuit 34 as being suitable for evaluation. For the further description of the invention it will be assumed, however, that both the transmit pulse $B_S$ and the useful echo $B_N$ have already been identified and located in the sampling sequence AF, since the method according to the invention is aimed at determining the level value $X_H$ by means of the already identified transmit signal $S_2$ and the already identified useful echo $B_N$ accurately, particularly accurately within a millimeter.

The invention is predicated on the surprising recognition that the transit-time difference $\Delta T$ will conform to the actual difference between reference time and corresponding transit time of the receive signal $E_2$ with high accuracy and good reproducibility if the amplitude value $U_E$ of the data tuple $D_E$ is set according to a predeterminable relation, particularly a proportional relation, to a maximum amplitude value of the useful echo $B_N$. To generate a corresponding extreme value $\hat{U}_{MAX}$ serving as an accurate an estimate of this maximum amplitude value as possible, a known pulse shape, particularly a constant pulse shape, for example the shape of a needle pulse, of the useful echo $B_N$ is assumed for the method of the invention.

It has also turned out that for a parametric description suited to determining the extreme value $\hat{U}_{MAX}$, a bell-shaped function, particularly the well-known Gaussian function, may be used. Such a function, as is well known, has a single extreme value which is located between two points of inflection of the function, i.e., between two points of extreme slope, and has a fixed relation, particularly a proportional relation, to their amplitude values.

By using such a point of inflection as the data tuple $D_E$, a great signal-to-noise ratio of the transit-time value $T_E$, and thus of the measured level value $X_H$, can be achieved, particularly because at such a point of inflection, the amplitude of the envelope signal ENV is highly sensitive to changes in level.

For the data tuple $D_E$, a data record of the sampling sequence AF may be used which after expiration of a minimum transit time representing a maximum measurable level reaches or exceeds the amplitude value of the point of inflection determined by the aforementioned relation.

If a Gaussian function serves as an approximation of the bursts, a relation of the amplitude value of one of the points of inflection to the extreme value of the function may be approximately −4.34 dB (=decibels), for example, i.e., the amplitude value $U_E$ of the data tuple $D_E$ is then approximately equal to 0.6 times the extreme value $\hat{U}_{MAX}$ determined for the useful echo $B_N$.

The amplitude value $U_E$ may be determined as $$U_E = k_0 \hat{U}_{MAX} \qquad (3)$$

where $k_0$ is a set proportionality factor representing a suitable relation $U_E / \hat{U}_{MAX}$ for the pulse shape actually used, and $k_0 \cdot \hat{U}_{MAX}$ serves as a settable threshold value for determining the data tuple $D_E$. For a Gaussian function as assumed above, $k_0$, as mentioned above, may be 0.6, for example.

It has also turned out that if the data tuple $D_E$ is determined in the manner described above, the accuracy of the measured level value $X_H$ is strongly dependent on the closeness with which the extreme value $\hat{U}_{MAX}$, estimated by means of sampling sequence AF, approaches the associated actual extreme value of the envelope signal ENV. Investigations have also shown that, particularly if a low sampling rate $T_a$ in the range of about five data records for one transmitted pulse or for one useful echo is set to generate the sampling sequence AF, a maximum first sample value $U_1$ of the sampling sequence AF in the range of the located useful echo $B_N$ may both differ considerably from the actual extreme value and, despite virtually unchanged measurement conditions, be subject to considerable variations. Accordingly, the simple use of a single data record $D_1$ of the sampling sequence AF with the sample value $U_1$ to approximate the actual extreme value may result in increased inaccuracy and/or increased spreading of the measured level value $X_H$.

To avoid the aforementioned errors, according to the invention, besides the data record $D_1$, at least a second and a third data record $D_2$, $D_3$ of the sampling sequence AF, particularly from the vicinity of data record $D_1$, are used to determine the extreme value $\hat{U}_{MAX}$. While the data record $D_2$, as shown in FIG. 3, has a sample value $U_2$ and a transit time $T_2$ which is less than a transit time $T_1$ of data record $D_1$, the data record $D_3$ has a sample value $U_3$ and a transit time $T_3$ which is greater than that of data record $D_1$. The data records $D_1$, $D_2$, $D_3$ may, for instance, follow one another in direct succession within the sampling sequence AF.

In a preferred embodiment of the method of the invention, the extreme value $\hat{U}_{MAX}$ of the useful echo $B_N$ is approximated by $$\hat{U}_{MAX} = -0.25 \cdot k_2^2 / k_1 + k_3 \qquad (4)$$

where $k_1$, $k_2$, $k_3$ are coefficients which can be calculated by means of the data records $D_1$, $D_2$, $D_3$ as follows:

$$k_1 = (-2 \cdot U_1 + U_2 + U_3)/(-2 \cdot T_1^2 + T_2^2 + T_3^2)$$
$$k_2 = (U_2 - U_3)/(T_2 - T_3) - k_1 \cdot (T_2 - T_3)$$
$$k_3 = -k_1 \cdot T_1^2 - k_2 \cdot T_1 + U_1.$$

Accordingly, the extreme value $\hat{U}_{MAX}$, determined by Eq. (4), describes a maximum of a parabolic function supported by the data records $D_1$, $D_2$, $D_3$.

Aside from a close correspondence of the estimated extreme value $\hat{U}_{MAX}$ with the associated actual extreme value of the envelope signal ENV, a close correspondence of the amplitude value $U_E$, determined according to Eq. (3), with the above-mentioned point of inflection of the useful echo $B_N$ is necessary for the determination of the level value $X_H$. Here, too, it has turned out that with a coarse resolution of the envelope signal ENV, particularly at a low sampling rate $T_a$, the choice of a single data record of the sampling sequence AF for the amplitude value $U_E$, for example of a fourth data record $D_4$, which just does not exceed the set threshold value $k_0 \cdot \hat{U}_{MAX}$, or of a fifth data record $D_5$, which exceeds the set threshold value $k_0 \cdot \hat{U}_{MAX}$ for the first time, may cause too large a measurement error.

Therefore, in a further preferred embodiment of the method of the invention, the transit-time value $T_E$ is determined by means of the extreme value $\hat{U}_{MAX}$ and the data records $D_4$, $D_5$ from:

$$T_E = T_4 + (k_0 \hat{U}_{MAX} - U_4) \cdot (T_5 - T_4)/(U_5 - U_4) \quad (5)$$

where $U_4$ = a sample value of data record $D_4$ $T_4$ = a transit-time value of data record $D_4$ $U_5$ = a sample value of data record $D_5$ $T_5$ = a transit-time value of data record $D_5$.

If the data tuple $D_s$ does not represent a point of inflection as does the data tuple $D_E$, but represents a peak of a transmitted pulse, for example, a resulting transit-time error $T_K$ must be taken into account in the formation of the transit-time difference $\Delta T$, so that Eq. (2) must be modified as follows:

$$\Delta T = T_S - T_E + T_K \quad (6)$$

For the above-described case that the pulse shape can be approximated by a Gaussian function, the transit time error $T_K$ may, for instance, be determined from:

$$T_K = \pm 0.5 \cdot \tau_B \cdot (\ln \hat{U}_{MAX} - \ln U_E)^{-0.5} \quad (7)$$

where $\tau_B$ = a transit-time difference, particularly a preset or predetermined transit-time difference, between the two points of inflection of the Gaussian function.

In another preferred embodiment of the invention, the extreme value $\hat{U}_{MAX}$, particularly with an equidistant conversion of the envelope signal ENV into the sampling sequence AF, is determined by means of an average of the sample values $U_1$, $U_2$, $U_3$ from:

$$\hat{U}_{MAX} = 0.33 \cdot (U_1 + U_2 + U_3) / (1 - 0.75 \cdot T_a^2/\tau_B^2) \quad (8)$$

The computation methods necessary to obtain the measured level value $X_H$ may, for instance, be implemented as program codes in a writable memory 35 of control unit 3, particularly in a permanent memory, such as an EPROM, a flash EEPROM, or an EEPROM, to which the above-mentioned microprocessor has at least temporary read access.

The level measuring device may, for instance, be connected directly or via a current loop to a field bus (not shown) and thus be linked to a remote control room and to an external power supply which feeds the level measuring device via an internal supply unit 4. To send measuring device data, particularly the measured level value $X_H$, to the field bus, the level measuring device further comprises a communications unit 5 with suitable data interfaces 51. Furthermore, communications unit 5 may include a display and control unit 52, particularly for visualizing measuring device data and/or for permitting adjustment of the level measuring device in situ.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A method of measuring level in a vessel by means of a level measuring device operating with pulses, said method compring the steps of:

coupling waves to be transmitted into the vessel and receiving echo waves reflected from the contents of the vessel;

generating an envelope signal representative of transmitted waves and echo waves with at least one echo pulse;

generating a digital sampling sequence from the envelope signal;

generating a first data tuple, representative of a reference point in said envelope signal;

generating a second data tuple, representative of an echo pulse in said envelope signal, by means of the sampling sequence, each of said first and second data tupel having an amplitude value and a transit time value; and deriving from the envelope signal a measured value representative of the level of the contents, this step comprising a step of determining a difference between the transit time value of the first data tuple and the transit time value of the second data tuple, wherein the step of generating the second data tuple further comprises the steps of:

determining a first data record of the sampling sequence, said first data record being representative of a local extremum of the sampling sequence and having a transit time value greater than that of the first data tuple;

determining at least a second data record of the sampling sequence having a transit time value greater than that of the first data tuple and less than that of the first data record;

determining at least a third data record of the sampling sequence having a transit time value greater than that of the first data record;

deriving from the digital sampling sequence an extreme value representative of a highest amplitude value of the echo pulse by means of the first, second, and third data records; and determining the transit time value of the second data tuple by means of said extreme value.

2. The method as claimed in claim 1 wherein the amplitude value of the second data tuple is set by means of a threshold value proportional to the extreme value.

3. The method as claimed in claim 1 wherein the waves to be transmitted are electromagnetic waves.

4. The method as claimed in claim 1 wherein the waves to be transmitted are microwaves.

5. The method as claimed in claim 1 wherein the waves to be transmitted are sound waves.

6. A method of measuring level in a vessel by means of a level measuring device operating with pulses, said method compring the steps of:

coupling waves to be transmitted into the vessel and receiving echo waves reflected from the contents of the vessel;

generating an envelope signal representative of transmitted waves and echo waves with at least one echo pulse;

generating a digital sampling sequence from the envelope signal;

generating a first data tuple, representative of a reference point in said envelope signal;

generating a second data tuple, representative of an echo pulse in said envelope signal, by means of the sampling sequence; each of said data tupel having an amplitude value and an transit time value; and deriving from the envelope signal a measured value representative of the level of the contents, this step comprising a step of determining a difference between the transit time value of the first data tuple and the transit time value of the second data tuple;

wherein the step of generating the second data tuple further comprises the steps of:

deriving from the digital sampling sequence an extreme value representative of a highest amplitude value of the echo pulse; and determining the amplitude value of the second data tuple by means of a threshold value proportional to the extreme value; and determining the transit time value of the second data tuple by means of said amplitude value of the second data tuple.

7. The method as claimed in claim 6 wherein the step of generating the second data tuple further comprises the steps of:

determining a first data record of the sampling sequence, said first data record being representative of a local extremum of the sampling sequence and having a transit time value greater than that of the first data tuple;

determining at least a second data record of the sampling sequence having a transit time value greater than that of the first data tuple and less than that of the first data record;

determining at least a third data record of the sampling sequence having a transit time value greater than that of the first data record;

generating the extreme value, representative of a highest amplitude value of the echo pulse, by means of the first, second, and third data records.

8. The method as claimed in claim 6 wherein the waves to be transmitted are electromagnetic waves.

9. The method as claimed in claim 6 wherein the waves to be transmitted are microwaves.

10. The method as claimed in claim 6 wherein the waves to be transmitted are sound waves.

* * * * *